(12) United States Patent
Hilbig et al.

(10) Patent No.: US 8,999,039 B2
(45) Date of Patent: Apr. 7, 2015

(54) OXYGEN SEPARATION MEMBRANE

(75) Inventors: Rainer Hilbig, Aachen (DE); Joachim Opitz, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 133 days.

(21) Appl. No.: 13/581,870

(22) PCT Filed: Feb. 4, 2011

(86) PCT No.: PCT/IB2011/050489
§ 371 (c)(1),
(2), (4) Date: Aug. 30, 2012

(87) PCT Pub. No.: WO2011/107898
PCT Pub. Date: Sep. 9, 2011

(65) Prior Publication Data
US 2012/0318145 A1    Dec. 20, 2012

(30) Foreign Application Priority Data

Mar. 5, 2010    (EP) .................................... 10155667

(51) Int. Cl.
*B01D 53/22* (2006.01)
*B01D 69/10* (2006.01)
*B01D 65/02* (2006.01)
*B01D 69/02* (2006.01)
*B01D 71/02* (2006.01)
*C01B 13/02* (2006.01)

(52) U.S. Cl.
CPC .............. *B01D 53/228* (2013.01); *B01D 65/02* (2013.01); *B01D 69/02* (2013.01); *B01D 71/02* (2013.01); *C01B 13/0255* (2013.01); *B01D 2256/12* (2013.01); *B01D 2259/4533* (2013.01); *B01D 2313/22* (2013.01); *B01D 2321/32* (2013.01); *B01D 2325/22* (2013.01); *B01D 2325/26* (2013.01); *C01B 2210/0046* (2013.01)

(58) Field of Classification Search
CPC ...... B01D 53/22; B01D 53/228; B01D 65/02; B01D 69/10; B01D 71/02; B01D 2256/12; B01D 2313/22; B01D 2321/22; B01D 2325/22; B01D 2325/26; B01D 2259/4533; C01B 13/0255; C01B 2210/0046
USPC ................................. 96/4, 11; 95/45, 54, 130
See application file for complete search history.

(56) References Cited

U.S. PATENT DOCUMENTS

| | | |
|---|---|---|
| 5,837,034 A | 11/1998 | Keskar et al. |
| 5,888,272 A | 3/1999 | Prasad |

(Continued)

FOREIGN PATENT DOCUMENTS

| | | |
|---|---|---|
| CN | 2064679 U | 10/1990 |
| EP | 0916384 | 5/1999 |

(Continued)

*Primary Examiner* — Jason M Greene
(74) *Attorney, Agent, or Firm* — Michael W. Haas

(57) ABSTRACT

The invention relates to membranes, in particular oxygen separation membranes, which enable improved gas separation conditions with respect to cost, price, size, weight, and noise. The membrane, in particular oxygen separation membrane, according to the invention comprises a support layer (28) and a separation layer (30), wherein the separation layer (30) is permeable for oxygen and has a sorptive affinity for at least one other gas, in particular for nitrogen, wherein the membrane (20) is designed such that substantially only the separation layer (30) is heatable by a heating device.

13 Claims, 2 Drawing Sheets

(56) References Cited

U.S. PATENT DOCUMENTS

| | | | |
|---|---|---|---|
| 6,010,614 A | 1/2000 | Keskar | |
| 6,361,584 B1 | 3/2002 | Stevens et al. | |
| 6,368,383 B1 * | 4/2002 | Virkar et al. | 95/54 |
| 6,406,518 B1 | 6/2002 | Bonaquist et al. | |
| 6,582,495 B2 * | 6/2003 | Chau et al. | 96/11 |
| 7,125,528 B2 * | 10/2006 | Besecker et al. | 95/54 |
| 7,229,537 B2 * | 6/2007 | Chen et al. | 95/54 |
| 7,413,595 B2 | 8/2008 | Schmidt et al. | |
| 7,892,321 B2 * | 2/2011 | Aagesen et al. | 95/54 |
| 7,927,405 B2 * | 4/2011 | Bacino et al. | 95/54 |
| 2005/0006249 A1 * | 1/2005 | Suzuki et al. | 205/633 |
| 2007/0180998 A1 | 8/2007 | Arnold et al. | |
| 2007/0246366 A1 * | 10/2007 | Mordkovich et al. | 204/627 |
| 2008/0047431 A1 * | 2/2008 | Nagabhushana et al. | 96/11 |
| 2013/0213227 A1 * | 8/2013 | Hilbig et al. | 95/54 |

FOREIGN PATENT DOCUMENTS

| | | |
|---|---|---|
| EP | 1452507 A1 | 1/2004 |
| GB | 2257054 | 6/1992 |
| JP | 8301603 A | 11/1996 |

\* cited by examiner

OXYGEN SEPARATION MEMBRANE

FIELD OF THE INVENTION

The invention relates to the field of oxygen separation. More specifically, the invention relates to oxygen separation for therapeutic applications, particularly in the field of home care.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy should be used to benefit the patient by increasing the supply of oxygen to the lungs and thereby increasing the availability of oxygen to the body tissues, especially when the patient is suffering from hypoxia and/or hypoxaemia. Oxygen therapy may be used both in applications in hospital or in home care. The main home care application of oxygen therapy is for patients with severe chronic obstructive pulmonary disease (COPD).

Oxygen may be administered in a number of ways. A preferable way of oxygen administration is by using a so-called on demand generation of oxygen. Referring to this, commercial solutions, so-called oxygen concentrators or separators, respectively, are widely known. These oxygen concentrators mostly separate oxygen from an oxygen containing gas by using a specially designed membrane which preferably is permeable for oxygen but selectively adsorbs other gases, especially nitrogen. Most known oxygen concentrators require a compressor to compress the oxygen containing gas to come up with the demanded oxygen flux of above 1 l/min at atmospheric pressure.

It is widely known to form pure oxygen by using a so called swing process, namely a pressure swing adsorption (PSA) or vacuum swing adsorption (VSA). Swing processes can be typically separated into two steps, namely an adsorption step and a regeneration step. In the adsorption step, mostly a bed with a membrane comprising a physical adsorbent material is contacted with a feed gas mixture of an oxygen containing gas. The oxygen containing gas mostly comprises oxygen and nitrogen. To separate the oxygen from the oxygen containing gas, the physical adsorbent material has sorptive affinity for nitrogen to adsorb this component, while the non adsorbed component (oxygen) forms a flux of pure gas. In order to circumvent saturation of the sorbent material with nitrogen, the latter has to be desorbed from the adsorbent material again. This desorption procedure of the bed, or the membrane, respectively, is the elementary measure of the regeneration step. The regeneration step may be realized by reducing the pressure and/or by flushing the adsorbent with fresh gas, e.g. air.

In a swing process, it is therefore advantageous to provide at least two beds, or membranes, respectively. This allows the different sorptive materials to be operated in an anticyclical manner thereby allowing a constant flow of oxygen containing gas and consequently of formed pure oxygen.

Besides the described PSA and VSA, it is also known to separate gases by applying the so called temperature swing adsorption (TSA). In TSA, heat is supplied to the membrane during the desorption step to improve the latter, whereas no heat is supplied during the adsorption step.

As a further gas separation method, a combined technology has been developed known as TPSA (temperature-pressure swing adsorption). This is a hybrid regeneration cycle, which combines many of the benefits of PSA and TSA whilst minimizing the associated costs. The TPSA process works in a similar manner to TSA, by supplying a heat pulse to drive off impurities from the membrane. However, with TPSA, the heat pulse energy is less than the energy required to desorb all the impurities from the membrane. The remaining impurities are removed by continuing to supply cool regeneration gas after the heat pulse has been extinguished. This second step may be realized because the stream of dry regeneration gas contains heat energy even if it is not heated above its supply temperature. By suitable adjustment of the conditions it is thereby possible to achieve repeated cycles of adsorption and regeneration with only a fraction of the heat of desorption being supplied by heating the regenerating gas.

However, the amount of power consumption is the reason why TSA combined with PSA and/or VSA is not in use for mobile oxygen generators for medical applications.

DEFINITIONS

The term "oxygen containing gas", as used herein, shall refer to any gas which at least partly comprises oxygen.

The term "internal side" of the pressure vessel as used herein, shall refer to the side of the pressure vessel which is directed towards the received oxygen containing gas.

The term "external side" of the pressure vessel as used herein, shall refer to the side of the pressure vessel which is opposed to the primary side and thus to its outside.

The term "primary side" of the membrane, as used herein, shall refer to the side of the membrane being directed towards the internal side of pressure vessel and to the gas inlet of the oxygen containing gas.

The term "secondary side" of the membrane, as used herein, shall refer to the side of the membrane being opposed to the primary side.

SUMMARY OF THE INVENTION

It is an object of the invention to provide a membrane, in particular an oxygen separation membrane, which enables to overcome the limitations as set forth above.

It is a further object of the invention to provide a membrane which enables an oxygen separation process being energy saving and which is better applicable especially in mobile oxygen separators e.g. in the field of home care applications.

It is a further object of the invention to provide a membrane which improves convenience with respect to maintenance and noise.

These objects are achieved by a membrane, in particular oxygen separation membrane, comprising a support layer and a separation layer, wherein the separation layer is permeable for oxygen and has a sorptive affinity for at least one other gas, in particular for nitrogen, wherein the membrane is designed such that substantially only the separation layer is heatable by a heating device.

The fundamental idea of the invention is thus to enable to heat up only specific parts of the membrane during a certain time interval of the PSA-process. By building the membrane such, that the separation layer is selectively heatable, very beneficial improvements are achieved. The volume which has to be heated is strongly reduced. This allows the membrane to be heated in a shorter period of time. As the heating procedure of the membrane is especially important in the regeneration step, the regeneration cycle of the membrane may be shortened leading to an increased flow of pure oxygen. Furthermore, the diffusion rate of oxygen through the membrane can significantly be improved.

Additionally, as the membrane is only partly heated, the desorption step requires less energy with respect to a membrane which is heated in its entire volume to a defined elevated temperature. Thus, a membrane according to the invention is energy efficient and cost saving. This is especially advantageous in the field of home care applications as the system may be constructed with a smaller battery resulting in an improvement of weight as well as size.

Furthermore, due to the faster desorption step, the gas flow on the primary side of the membrane can be significantly lowered. This has the effect that smaller and cheaper compressor units may be used which is cost-saving and furthermore reduces noise.

Additionally, the membrane according to the invention allows a sufficiently high oxygen flux even when formed with a decreased size. Again, this leads to an improvement with respect to system size and weight.

Consequently, an oxygen separating membrane according to the present invention is advantageous with respect to cost, price, size, weight, and noise.

In a preferred embodiment of the present invention, the separation layer is at least partly separated from the support layer by an isolation. This isolation may be designed as a thermal isolation and/or as an electrically isolation, like described below. In case a thermal isolation is provided, it minimizes or completely avoids a thermal flux between the separation layer and the support layer. It is thus securely avoided that the heated separation layer looses energy to the support layer. The energy thus stays where it is needed which further reduces the energy input for the regeneration step. In this regard, it is especially advantageous that the heat isolation is designed as a porous structure, in particular as an aerogel. This is a very effective arrangement to avoid thermal fluxes. Especially very porous structures may securely avoid the support layer being heated by the separation layer and thus energy being lost.

It is further advantageous, that the separation layer is doped. This enables the separation layer to selectively adsorb a defined radiation and thus to selectively interact with radiation being optionally emitted by the heating device, in case the latter comprises radiation emitting means. This enables an especially easy way of a spatial heating. In this regard, it is especially preferred, that the isolation comprises a mirror. This enables the radiation being reflected at the mirror before entering the support layer so that a penetration of the radiation into the support layer resulting in heating the support layer is securely avoided.

In a further preferred embodiment of the present invention, heating coils are provided in the separation layer. This is a very cost saving way of a spatial heating in the separation layer. Furthermore, as the heating coils are in direct contact with the separation layer, the energy input may be minimized and the heating time is strongly reduced.

In a further preferred embodiment of the present invention, the separation layer is electrically conducting. This allows to use ohmic heating means comprised in the heating device. This is a very efficient heating means as the heat is produced directly in the separation layer. Energy losses caused by a heat flow can thus be decreased. In this regard, it is especially preferred, that the isolation is designed as an electrical isolation. The ohmic heating means may advantageously be realized by running a current through the selective layer. Exemplarily, an electrical connection of the separation layer via connectors to an outer electrical power source may be used, or a current may be induced in the separation layer by applying electromagnetic fields.

In a further preferred embodiment of the present invention, a second isolation is provided adjacent to the separation layer and positioned opposite to the support layer. This arrangement further improves the isolation of the separation layer and thus improves the heating time as well as the energy input. The regeneration time may thus further be shortened.

The invention further relates to an oxygen separating system, comprising: a pressure vessel for receiving oxygen containing gas and having an internal and an external side, a membrane for separating oxygen from the oxygen containing gas, a heating device for heating the membrane, and a means for creating a pressure difference between the internal and the external side of the pressure vessel, wherein the membrane is a membrane according to the invention.

It is advantageous, that the heating device comprises a radiation emitting means, in particular a light-emitting diode (LED), or a laser, especially a solid state laser. Due to the heating procedure based on radiation, a very energy saving and directed heating process is realized allowing the separation layer to be heated in a spatial way. This embodiment is especially advantageous in case the separation layer is doped like described above.

In a further preferred embodiment of the present invention, a cooling device is provided for cooling the separation layer. This enables to cool down the separation layer before and/or during the adsorption step allowing counteracting against the heat being produced due to the adsorption of the nitrogen. The adsorption process may thus be improved.

In a further preferred embodiment of the present invention, the means for creating a pressure difference between the internal and the external side of the pressure vessel is designed as a compressor, in particular as a plasma pump. The provision of a plasma pump has the effect that the gas coming from the compressor has an elevated temperature and may thus heat the membrane during the adsorption step. When the regeneration step is started, the membrane has an elevated temperature allowing an improved desorption process. The heating element is thus directly combined with the means for creating a pressure difference between the internal side and the external side of the pressure vessel. This is a very effective and cost-saving arrangement.

In a further preferred embodiment of the present invention, a means is provided for selectively turning the heating device on or off. This allows the system according to the invention to work in a "normal" mode without the membrane being heated. The heating device may just be turned on, when an improved performance is required. This is considerably cost-saving and furthermore energy-saving allowing working with a much smaller battery. This additionally improves the handling properties of the system according to the invention.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
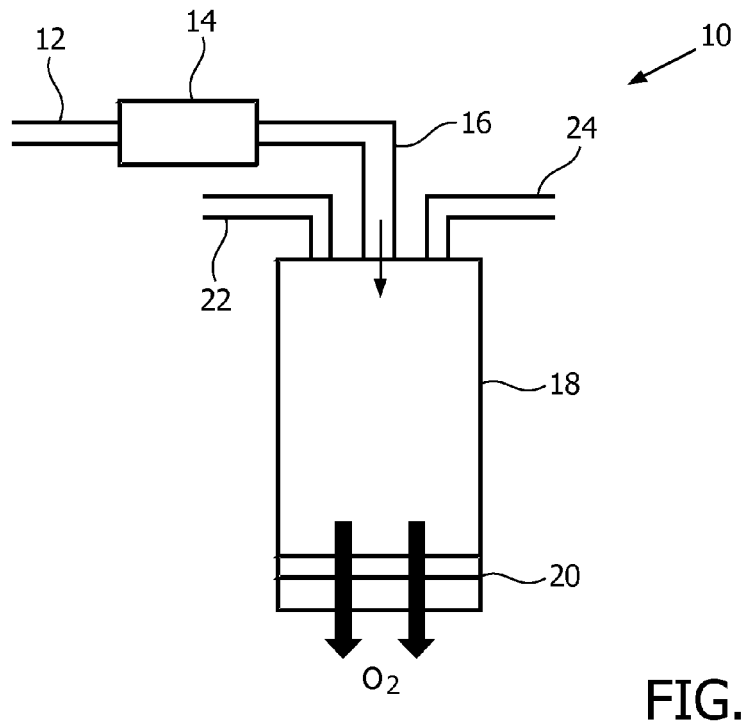
FIG. 1 shows the oxygen separating system according to the invention in an adsorption mode.

In FIG. 1, an oxygen separating system 10 according to the invention is schematically shown. The system 10 is very well suitable for oxygen therapy e.g. in home care applications. However, the system 10 according to the invention is not limited to therapeutic applications, but is furthermore suitable for all kinds of generation of oxygen. As further exemplary applications, it is referred to the oxygen generation in airplanes or in submarines.

According to FIG. 1, the system 10 according to the invention is shown in an adsorption mode. That means that oxygen is separated from the oxygen containing gas whereas nitrogen is adsorbed and thus removed from the respective gas stream.

The oxygen separating system 10 comprises a gas inlet 12 for guiding the oxygen containing gas into the system 10. The oxygen containing gas may be every kind of gas which at least partly comprises oxygen. However, the usage of air as oxygen containing gas is most preferred. Downstream the gas inlet 12, the oxygen containing gas is guided through a conduct 16 into a pressure vessel 18, which receives the oxygen containing gas.

The pressure vessel 18 may be formed as a container having a size which is much greater with respect to the conduct 16. However, it is furthermore possible to use a further conduct as a pressure vessel 18 without leaving the invention as such. In the latter case, the pressure vessel 18 has the same or substantially the same size compared to the conduct 16 and may be formed in one piece with the conduct 16. Consequently, it is possible to use the conduct 16 as such as pressure vessel 18. The pressure vessel may be any kind of recipient for receiving the oxygen containing gas.

Preferably, the pressure vessel 18 is at least partly closed by a membrane 20 according to the invention like described below. The membrane 20 has a primary and a secondary side like defined above. The membrane 20 is permeable for oxygen but has a sorptive affinity for at least one other gas, depending on the used oxygen containing gas. However, air is preferred as oxygen containing gas, because of which the membrane 20 may have a sorptive affinity for nitrogen. This enables nitrogen to be adsorbed by the membrane 20 and thus being removed from the gas stream, whereas oxygen passes the membrane 20 and a flow of pure oxygen gas is formed. The formed gas stream may then directly be used, e.g. administered to a patient, or stored and used later on.

To enable said gas stream flowing through the membrane 20, a means for forming a pressure difference between the internal side and the external side of the pressure vessel 18 is provided. This means advantageously may be a compressor 14, which is located downstream the gas inlet 12 and upstream the pressure vessel 18. The compressor 14 compresses the oxygen containing gas and conveys it through the conduct 16 into the pressure vessel 18. Therefore, by means of the compressor 14, an overpressure of the oxygen containing gas, e.g. air, is created in the pressure vessel 18. Preferably, the oxygen containing gas has an overpressure of 1 bar or even more than 1 bar. It is possible to use any kind of compressor 14 known in the art insofar as it is applicable to create the respective overpressure in the pressure vessel 18.

Alternatively, it is possible to create an underpressure at the external side of the pressure vessel 18 and thus at the secondary side of the membrane 20 to force the oxygen to flow through the membrane 20 and thus to create the desired flow of pure oxygen. In this case, a defined volume is provided at the secondary side of the membrane 20. The means for providing a pressure difference between the internal side and external side of the pressure vessel 18 may thus be designed as a vacuum pump. However, it is essential to create a pressure difference between the internal side and the external side of the pressure vessel 18 to get an adequate flow of pure or at least substantially pure oxygen.

It is advantageous to improve the adsorption step by providing a cooling means to cool down the membrane 20 to counteract the produced adsorption energy. However, a cooling means is not strictly necessary, as the membrane 20 is cooled by the flow of fresh oxygen containing gas. This cooling effect may be sufficient for some applications.

The pressure vessel 18 furthermore comprises a second gas inlet 22 as well as a gas outlet 24 which will be described with respect to FIG. 2. The second gas inlet 22 as well as the gas outlet 24 is closed in the adsorption mode, which is important for the creation of said overpressure in the pressure vessel 18. The closure of the gas inlet 22 and the gas outlet 24 may be realized by valves known as such.

Figure 2:
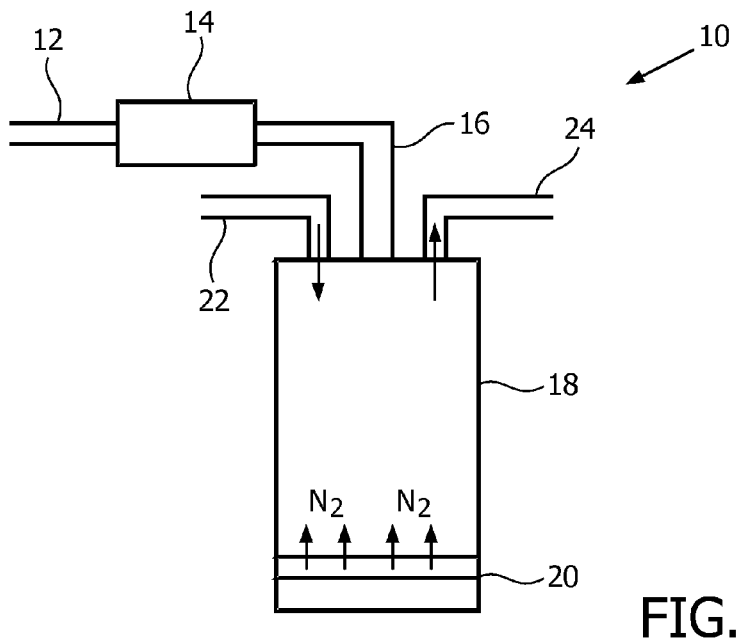
FIG. 2 shows the oxygen separating system according to the invention in a regeneration mode.

In FIG. 2, the system according to the invention is shown in a regenerative mode. Like described above, the membrane 20 according to the invention is designed to adsorb nitrogen. During operation, the membrane 20 will be saturated with nitrogen at some point leading to the adsorption capacity to decrease resulting in a decrease of separation performance of the oxygen separation system. Therefore, it is essential to regenerate the membrane 20 by desorbing the adsorbed nitrogen.

In order to obtain an adequate desorption of nitrogen, the pressure inside the pressure vessel 18 may be reduced e.g. to atmospheric pressure and the pressure vessel 18 may be flushed with fresh air. Therefore, air may be guided into the pressure vessel 18 through the gas inlet 22 which may preferably be equipped with a gas pump, thereby separating the compressor 14 from the pressure vessel 18. Alternatively, fresh air might be guided into the pressure vessel 18 through the inlet 12 and the conduct 16. This allows the nitrogen adsorbed in the membrane 20 during the adsorption process to be desorbed from the membrane 20 and to diffuse back into the volume at the internal side of the pressure vessel 18 and furthermore out of the pressure vessel 18 through the gas outlet 24. A regeneration of the membrane 20 may furthermore be achieved by guiding fresh air through the membrane 20 from its secondary side to its primary side.

In case the membrane 20 is fully regenerated, a new adsorption circle may start again and the system 10 according to the invention may be operated in an adsorptive mode again.

To improve the desorption step, it is necessary to heat the membrane 20 to provide the required desorption energy. However, the heating process is energy as well as time consuming. To improve the heating process, according to the invention, the membrane 20 is a composite membrane and formed in a layer structure. This is shown in FIG. 3.

Figure 3:
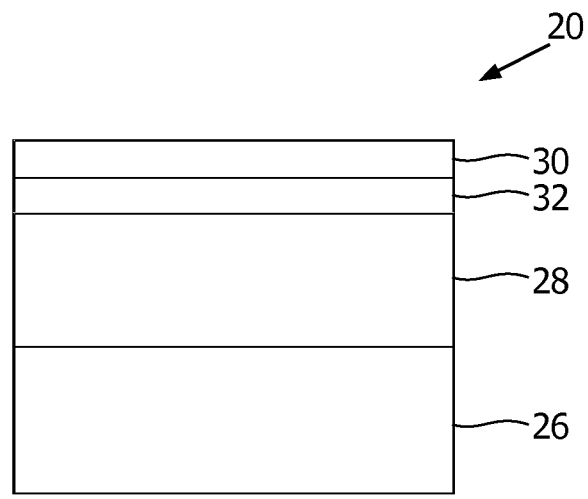
FIG. 3 shows one embodiment of a membrane according to the invention.

According to FIG. 3, the membrane 20 may optionally comprise a carrier layer 26. The carrier layer 26 may be a woven or non-woven fabric and improves the mechanical strength and handability of the membrane 20. The carrier layer 26 shows relatively large pores which allow for an unhindered gas flow. Preferentially, as the other parts of the membrane 20, the carrier layer 26 is resistant against chemicals and higher temperatures.

For the process of gas separation, preferentially multi-layer membranes are utilized, which comprise at least two layers of different chemical composition, in addition to the optional carrier layer 26. In general, such composite membranes 20 comprise a first porous sublayer which determines mainly the mechanical strength of the membrane 20. This layer is a support layer 28. An advantageous thickness for this support layer 28 is in the range of 30 to 70 µm, in particular about 50 µm. The support layer 28 as well as the carrier layer 26 usually have typical values of porosity of less than 50%. Adjacent to the sublayer, a second layer of a chemically different material which mainly determines the separation characteristics of the membrane 20 is provided. This layer is the separation layer 30. The separation layer 30 may be microporous or dense and pore-free. It may have a thickness of 0.25 to 10 µm, in particular 0.5 to 5 µm. Like described above, the separation layer has a sorptive affinity for at least one gas apart from oxygen, in particular for nitrogen, for removing the latter out of the gas stream.

It is sufficient to only heat the separation layer 30 before and/or during the desorption step. Due to this selective and spatial heating, a smaller volume has to be heated resulting in less energy being required and less time being necessary. The heating may thereby start shortly before or at the beginning of the desorption step and should finish before the end of the desorption step. The separation layer 30 has time to cool down before a new adsorption phase starts. Typical desorption temperatures may be in a range of 150° C. to 200° C. Referring to a separation layer 30 having a thickness of 1 µm and a surface of 1 m$^2$, a temperature increase of $\Delta T=100$ K of the separation layer 30, in an exemplary value, may be realized in a time range being below 1 second. This is an outstanding improvement with respect to the state of the art. Furthermore, the desorption rate of nitrogen may be increased by more than a factor of 2, which furthermore is a significant increase.

To achieve such a spatial heating, the membrane 20 is designed such that substantially only the separation layer 30 is heatable by the heating device. The membrane 20 may thus be adjusted to the heating device. Several different heating elements may thus be provided. According to the invention it is essential that these heating elements are designed for a selective and spatial heating of the separation layer 30 only. In contrast, the support layer 28 and optionally the carrier layer 26 will not be heated.

One preferable heating device is a radiation emitting means. An especially preferable means is a light-emitting diode (LED), or a laser e.g. a solid state laser. By using such radiation sources, the radiation can be focused to the separation layer 30 and thus selectively heat only this part of the membrane 20. This effect can even more be improved by doping the separation layer 30. Exemplarily, in case that the separation layer 30 is an inorganic material, it may be doped with rare earth elements. This allows the separation layer 30 to have a well defined adsorption range which may be adjusted to the radiation source. The separation layer 30 is thus selectively heated without having any impact to the support layer 28, or the carrier layer 26, respectively. To achieve an appropriate and effective heating process, the separation layer 30 may have an efficiency of adsorption of the radiation of ≥25% to ≤100%.

In case a radiation emitting means is used for heating the separation layer 30, it may be required to design one or more of the further layers to be translucent for the radiation applied. As an example, if the radiation is applied from top of the membrane 20, an optional isolation layer 34 has to be translucent. In case the separation layer 30 is irradiated from down below, the support layer 28 as well as the carrier layer 26 has to be translucent. It may as well be possible to design all further layers to be translucent for the radiation applied. In this case, the design of the heating element is much less restricted. In fact, the radiation applied, or the wavelength of the radiation, respectively, may be chosen in accordance to the layers used, e.g. to the carrier layer 26 and the support layer 28. This allows applying a radiation wavelength which is not adsorbed by the respective layers (e.g. carrier layer 26 and the support layer 28) but only by the separation layer 30.

In another embodiment of the present invention, the heating device may comprise heating coils being provided in the separation layer 30. It is furthermore possible to provide ohmic heating means. In this case, it is preferable that the separation layer 30 is electrically conducting to achieve the desired effect. Furthermore, heat exchangers are possible to heat the separation layer 30, or a current may be conducted through a conductive separation layer 30, as well having the desired heating effect.

In another embodiment, the separation layer 30 is heated by gas coming out of the outlet of the compressor 14. This may be realized because compression of a gas comes up with gas heating; this heated gas can increase the temperature of the separation layer 30. As an example of a compressor 14 resulting with a significant temperature increase of the gas, a plasma pump provides hot air coming out of the outlet of the plasma pump compressor. The hot compressed air will heat up the separation layer 30 of the membrane 20 during the adsorption step and will reach a maximum temperature at the end of the adsorption process. The regeneration step thus starts with a membrane 20 having an adequate temperature. However, by flushing the membrane 20 with fresh cool air during the desorption step, the membrane 20 will quickly cool down again. Therefore, at the end of the desorption process, the membrane 20 has a temperature being low enough to ensure an adequate adsorption process.

However, the heating element is not delimited to the examples stated above. Like described, any heating element may be used which is capable of spatially heating the separation layer 30 and the membrane 20 may be adjusted to the respective used heating elements.

To further improve the spatial heating process, the separation layer 30 may be separated from the support layer 28 by a special isolation 32. This isolation 32 may be formed as an electrically isolation, or as a thermal isolation, or heat isolation, respectively. The isolation 32 has as object to support focusing the heating process to the separation layer 30. In this regard, the isolation 32 may be a layer having a great thermal resistance.

In any case, it is advantageous that the isolation 32 completely avoids a thermal flux from the separation layer 30 to the support layer 28 or that the heat flow from the separation layer 30 to the support layer 28 is at least substantially negligible. This ensures that all energy being inducted into the separation layer 30 is used to only heat the latter. Consequently, no energy will get lost which improves the efficiency of the heating process.

Possible examples of especially thermal isolations 32 are very porous structures. These structures may have a much greater porosity and consequently a much lower density compared to the support layer 28, or the carrier layer 26, respectively. Such a porous structure may be realized because in contrast to the support layer 28, or the carrier layer 26, the isolation has not to provide mechanical strength but may just isolate the separation layer 30. The porosity of the isolation layer may be in the range of 50 to 99.9%, especially in the range of 80 to 99.8%, in particular in the range of 90 to 99.8%, the bulk density may preferably be in a range of below 0.5 g/cm$^3$ with a typical value of 0.1 g/cm$^3$.

A preferable material usable for an isolation is an aerogel. An aerogel is a material with possibly the lowest bulk density of any known porous solids known. It may be derived from a gel in which the liquid component has been replaced with a gas. Aerogel thus is an extremely low-density solid with several remarkable properties, most notably its effectiveness as a thermal insulator and its extremely low density. Another possible thermal isolation 32 is a foamed quartz glass in which the porous structure is opened so that it is gas permeable, or an air gap which is provided between the separation layer 30 and the support layer 28.

In case the separation layer 30 is heated by radiation, it is furthermore advantageous that the isolation 32 comprises a mirror. A mirror reflects the radiation and ensures that no radiation enters the support layer which avoids heating the latter. Thus, it is required that the mirror reflects the wavelength being emitted from the radiation source. Furthermore, radiation which is not adsorbed by the separation layer 30 will again cross this layer. The energy input can thus further be minimized. This may result in an adsorption efficiency of at least 50%. However, it is apparent that in dependence of the position of the radiation source, a mirror may be inappropriate because it may permit the radiation to enter the separation layer. In fact, the usage of a mirror in the isolation layer 32 and/or 34 has to be in accordance with the position of the radiation emitting means.

Figure 4:
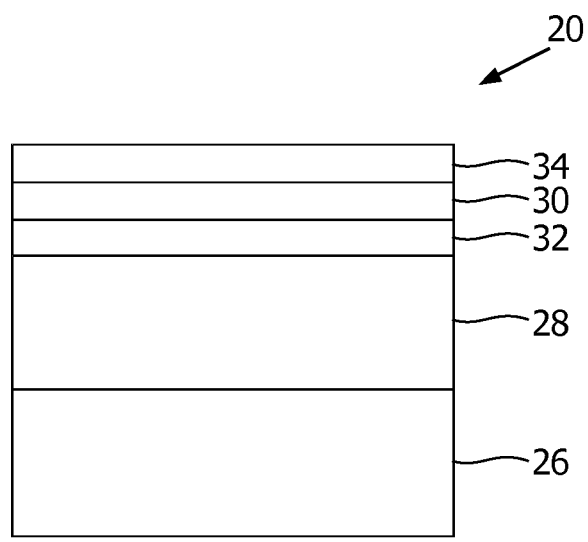
FIG. 4 shows a further embodiment of a membrane according to the invention.

It may furthermore be advantageous to provide a second isolation 34 like shown in FIG. 4. The isolation layer 34 may have the same properties with respect to e.g. porosity, or comprised components compared to the isolation layer 32. This second isolation 34 has the effect that the separation 30 layer is embedded between two isolation layers in a sandwich structure. Due to this sandwich structure, the separation layer 30 may be substantially thermal decoupled from its environment especially if both isolations 32 and 34 are thermal isolations. This minimizes energy losses to a minimum. In case an isolation layer 32, and/or 34 is provided, it should be translucent for radiation used by an optional heating of the separation layer 30 with a radiation emitting means. In this case, it is of course advantageous if the used wavelength is chosen such that is will not be adsorbed by the isolation layer 32, and/or 34, respectively. It is advantageous, that the isolation layer 34 is permeable for oxygen but may be also permeable for other gases.

In case the membrane 20 at least partly closes the pressure vessel 18, the membrane 20 may be a sheet-like composite membrane having a layer structure, like it is shown in FIGS. 3 and 4. In this case the adsorption or desorption process, respectively, may be realized like described above.

However, in some applications it may be preferred to arrange the membrane 20 according to the invention like described for a flat layer structure as small particles being located in the pressure vessel 18 in the form of a packed bed. The membrane 20 thus forms a bed of physical adsorbent. In this case, the separation layer 30 is positioned at the outer periphery of the particles, whereas the support layer 28 is arranged below the separation layer 30 as a core. In this case, the adsorption process may be realized as follows. In the pressure vessel 18, an overpressure of the oxygen containing gas may be provided like described above. This forces the gas to penetrate into the separation layer 30 of the membrane 20, thereby adsorbing the nitrogen contained in the oxygen containing gas. As the oxygen will not be adsorbed, downstream the membrane 20, the pressure vessel 18 comprises an outlet through which a pure oxygen flow may be realized. To desorb the nitrogen from the membrane, again, the pressure may be decreased to atmospheric pressure and the pressure vessel 18 as well as the membrane 20 may be flushed with fresh air.

In another aspect of the invention, a means may be provided to turn the heating device on or off, depending on the desired mode of operation. This means may be a control unit but is not limited to this example. In this embodiment, the system 10 according to the invention may run in a "normal" mode with the heating device turned off, thereby providing a flow of pure oxygen in an exemplary range of 1 l/min. This flow is sufficient for most applications. However, in case a greater flow is required, the heating device may be turned on, resulting in the separation layer 30 being heated like stated above in a kind of "burst operation mode". This enables greater flows of pure oxygen in an exemplary range of 2 or 3 l/min only when it is needed. The energy consumption of the system 10 according to the invention is thus considerably decreased against a system designed to supply oxygen flows of 2-3 l/min. Especially in portable home care systems, it is thus possible to equip the latter with smaller batteries improving the handling properties significantly.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A filter element, in particular for oxygen separation, comprising a support layer and a separation layer, wherein the separation layer is permeable for oxygen and has a sorptive affinity for at least one other gas, in particular for nitrogen, wherein the filter element includes an isolation structure that separates the support layer from the separation layer such that substantially only the separation layer is heatable by a heating device.

2. The filter element according to claim 1, wherein the isolation structure is configured as a thermal isolation comprising a porous aerogel.

3. The filter element according to claim 1, wherein the separation layer is doped.

4. The filter element according to claim 1, wherein the isolation structure is configured to reflect one or more wavelengths emitted from the heating device.

5. The filter element according to claim 1, wherein heating coils are provided in the separation layer.

6. The filter element according to claim 1, wherein the separation layer is electrically conducting.

7. The filter element according to claim 1, wherein a second isolation structure is provided adjacent to the separation layer and positioned opposite to the support layer.

8. An oxygen separating system, comprising:
   a pressure vessel for receiving oxygen containing gas and having an internal and an external side,
   a filter element for separating oxygen from the oxygen containing gas, the filter element comprising a support layer and a separation layer, wherein the separation layer is permeable for oxygen and has a sorptive affinity for at least one other gas, wherein the filter element includes an isolation structure that separates the support layer from the separation layer,
   a heating device for heating the filter element, wherein the heating device is configured to provide heat to the separation layer separately from the support layer (28), wherein substantially only the separation layer is heatable by the heating device, and
   a compressor configured to create a pressure difference between the internal and the external side of the pressure vessel.

9. System according to claim 8, wherein the heating device comprises a light-emitting diode (LED) or a solid state laser.

10. System according to claim 8, wherein the heating device comprises ohmic heating means.

11. System according to claim 8, wherein a cooling device is provided for cooling the separation layer.

12. System according to claim 8, wherein the compressor is a plasma pump.

13. System according to claim 8, wherein a means is provided for selectively turning the heating device on or off.

\* \* \* \* \*